United States Patent [19]

Hamilton

[11] 3,980,321
[45] Sept. 14, 1976

[54] HITCH PIN ASSEMBLY FOR A TRACTOR-SCRAPER VEHICLE AND THE LIKE

[75] Inventor: Thomas R. Hamilton, Joliet, Ill.

[73] Assignee: Caterpillar Tractor Co., Peoria, Ill.

[22] Filed: Dec. 23, 1974

[21] Appl. No.: 535,934

[52] U.S. Cl. .............................. 280/515; 403/156
[51] Int. Cl.² .......................................... B60D 7/02
[58] Field of Search ..................... 280/515; 151/54; 403/156

[56] References Cited
UNITED STATES PATENTS

| | | | |
|---|---|---|---|
| 1,319,948 | 10/1919 | Bodine | 151/54 |
| 2,937,040 | 5/1960 | Hutton | 403/156 X |
| 3,129,966 | 4/1964 | Blank | 403/156 |
| 3,680,892 | 8/1972 | Olthoff et al. | 280/489 |
| 3,713,686 | 1/1973 | Eddy et al. | 151/54 |

FOREIGN PATENTS OR APPLICATIONS

| | | | |
|---|---|---|---|
| 62,666 | 3/1927 | Sweden | 403/156 |

*Primary Examiner*—M. H. Wood, Jr.
*Assistant Examiner*—Michael J. Forman
*Attorney, Agent, or Firm*—Phillips, Moore, Weissenberger, Lempio & Strabala

[57] ABSTRACT

A hitch pin assembly for a tractor-scraper vehicle and the like in which the assembly serves as an articulation element in a location encumbered with many other pieces of equipment causing difficult access. The assembly comprises a pivot pin threaded on both ends and formed for fitting completely axially through a pair of machine elements mounted on the tractor and scraper respectively, a pair of adjusting nuts internally threaded to fit the threaded ends of the pivot pin, and a pair of locking elements in the form of retainer plates adapted to fit over the pair of adjusting nuts and restrain them against rotation with respect to the machine elements.

8 Claims, 4 Drawing Figures

HITCH PIN ASSEMBLY FOR A TRACTOR-SCRAPER VEHICLE AND THE LIKE

BACKGROUND OF THE INVENTION

The present invention relates to a hitch pin assembly for a tractor-scraper vehicle and the like, and more particularly to a horizontal connecting pin for connecting a hitch assembly of a scraper to the frame member of the tractor of a tractor-scraper combination.

It is well known that the connecting elements between the tractor section and the scraper section of a tractor-scraper unit must provide for the relative rotation or oscillatory motion between the tractor and scraper. In other words, the forces caused by the lateral motion of the tractor generated by load or the terrain should be relieved and not necessarily transmitted to the scraper portion. Conversely, lateral motion of the scraper does not necessarily affect tractor portion. This characteristic is achieved by making the tractor-scraper essentially an articulated vehicle, and the hitch assembly serves as the articulation element.

Various pin joints, links, and cylinders are used in the hitch assembly to provide the articulated connection between the tractor and scraper, and the subject hitch pin assembly comprises a horizontal hitch pin used to connect the large hitch casting of the scraper unit to the frame portion of the tractor.

Prior to this invention, pins used in this hitch joint were made such that they had to be installed or removed from one end of the joint. In addition, any adjustments necessary to achieve a tight connection or to compensate for wear had to be made only from one end of the joint. As a result of this construction, a problem has been encountered in the form of extremely difficult removal or adjustment of the hitch pin. This problem has been aggravated by the multitude of hydraulic hoses and lines, which are necessary to operate various hydraulic and electrical equipment and tractor scraper unit, causing close quarters and difficult access to the hitch pin to be present in the tractor-scraper vehicles now in extensive use.

SUMMARY OF THE INVENTION

Accordingly, it is a primary object of the present invention to provide a horizontal pivot pin assembly for making an articulated connection between tractor section and trailing section of an articulated vehicle such as a tractor-scraper unit, in which the assembly includes a pivot pin construction which is similar at both ends, capable of insertion and removal from both ends, and capable of adjustment at both ends.

Another object of the invention is to provide a hitch pin assembly of the character described, which is capable of easy and accurately fixed adjustment to compensate for wear and the like.

Further objects and advantages of the invention will become more apparent as the specification progresses.

In accordance with the invention, a horizontal pivot pin assembly is provided for making the connection between two relatively oscillatory machine elements such as a tractor-scraper vehicle. The hitch pin assembly comprises a pair of relatively oscillatory machine elements carried on the vehicle, a pivot pin threaded on both ends and formed for fitting completely axially through said machine elements whereby the pin may be inserted from one side of the elements and be removed from the other side thereof, a pair of adjusting nuts internally threaded to fit on the threaded end of the pivot pin, and a pair of locking elements adapted to fit the pair of adjusting nuts and restrain them against rotation with respect to the machine elements. The pivot pin is provided with associated bearing structures and thrust packages for carrying load and thrust sources, with such associated structure being that conventionally in use at the present time. In addition, the device will contain various electrical and hydraulic control equipment in the surrounding area rendering access to the units somewhat difficult. Thus the ability to remove either or both adjusting nuts and slide the pivot pin axially outward from either side is of particular advantage. In addition, the device is constructed so that adjustment of the pivot pin within the thrust packages is achieved by adjusting either nut.

Accordingly, adjustments may be made by removing the locking means from its associated nut and adjusting that nut while leaving the other nut and associated locking structure in position. The unit is also constructed so that the locking nuts are easily accessible by ordinary tools. Preferably the locking devices are in the form of plates which are easily attached by removable fastening means, and which will positively hold the nut in a desired position of rotation. In the preferred form, octagonal nuts are utilized together with a locking means in the form of a plate having an internal socket adapted to fit against certain of the sides of the nut so that the nut will be positively secured and positioned at 45° intervals.

BRIEF DESCRIPTION OF THE DRAWING

A preferred form of the invention is illustrated in the accommpanying drawing forming a part of this description, in which.

While only the preferred form of the invention is shown, it should be understood that various changes or modifications can be made within the scope of the claims attached hereto without departing from the spirit of the invention.

DETAILED DESCRIPTION OF THE PREFERRED EMBODIMENT

Figure 1:
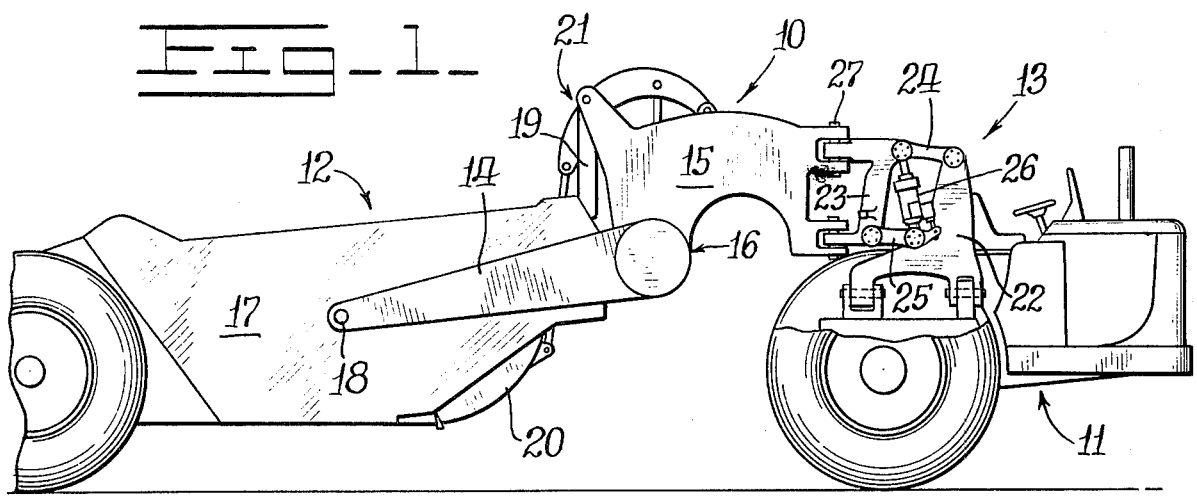
FIG. 1 is a side elevational view of a tractor-scraper unit utilizing the hitch pin assembly of this invention.

Referring more particularly to the drawing, there is shown in FIG. 1, a tractor-scraper unit 10 having a tractor portion 11 and a scraper portion 12; which portions are joined by a hitch assembly 13.

The scraper portion is a typical scraper construction comprising a pair of draft arms 14 (one of which is shown) connected to a goose neck structure 15 at 16 and to a bowl 17 by trunion assembly 18. A plurality of hydraulic cylinders 19 (one of which is shown) are connected between the goose neck and the bowl for raising and lowering the bowl during the work cycle of the vehicle. An apron 20, which is raised and lowered by lift assembly 21, of the scraper bowl 17 is also provided. The tractor portion 11 is also typical in structure, and provides motive power to the entire unit as well as power to the hydraulic cylinders 19 and lift assembly 21 through hydraulic control lines which pass through the region of the hitch assembly.

Figure 2:
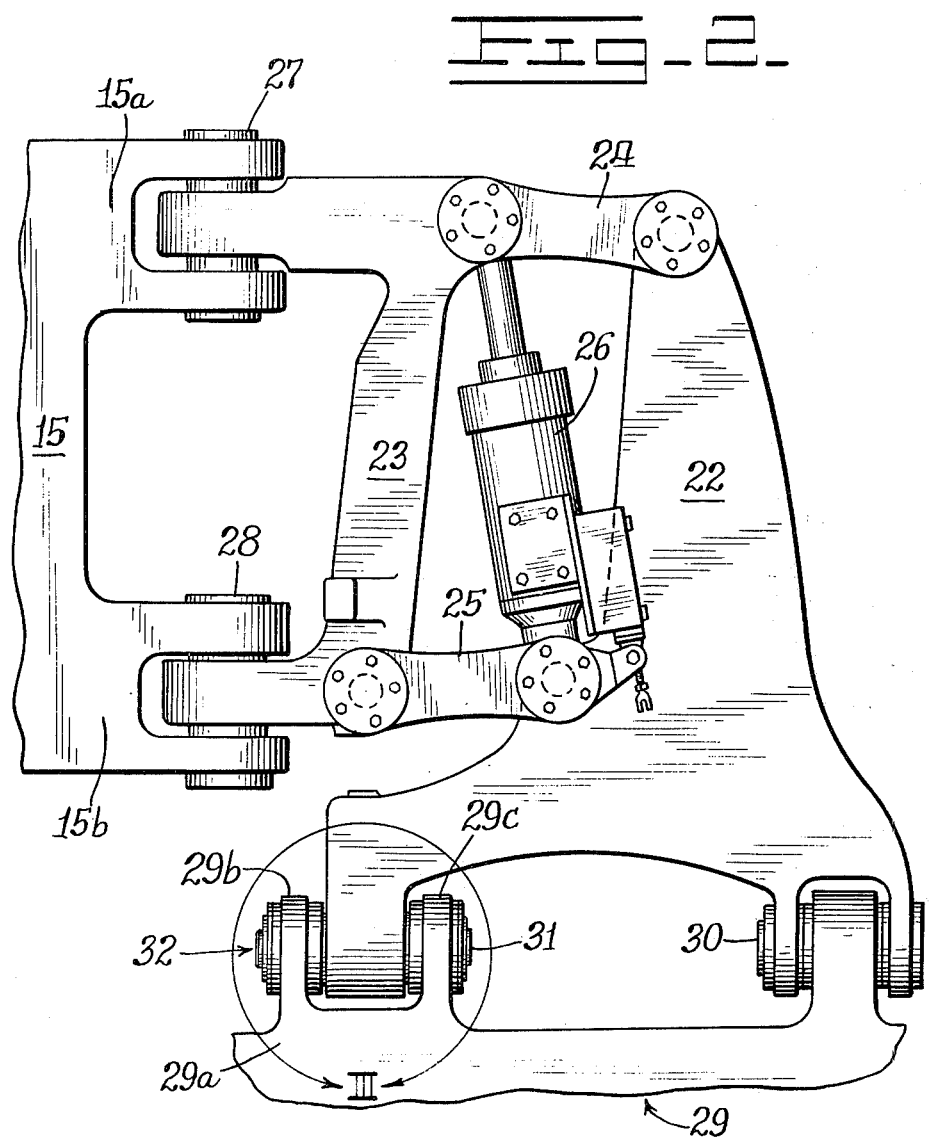
FIG. 2 is an enlarged side elevational view of the hitch portion only of the tractor scraper unit of FIG. 1.

The preferred hitch assembly 13 is shown in enlarged form in FIG. 2, where a cushion hitch assembly and the major element thereof are shown. For a more complete detailed description of this cushion hitch structure, reference is made to U.S. Pat. Nos. 3,311,389; 3,430,657; and 3,680,892.

As shown in FIG. 2 the cushion hitch assembly comprises large and small brackets 22 and 23 interconnected by links 24 and 25, and a hydraulic cylinder 26. The small bracket 23 is pivotally connected to the goose neck 15 by a pair of vertical pins 27 and 28, which extend through the brackets 23 and a pair of U-shaped yokes 15a and 15b formed on goose neck 15 as shown in FIG. 2. The large bracket 22 is pivotally connected to the frame of the tractor 11 by a pair of horizontal pivot pins 30 and 31. Pivot pin 31 extends through a U-shaped yoke 29a formed on the top of the frame 29, and having a pair of upstanding legs 29b and 29c. This pivot pin 31 and associated structure forms a hitch pin assembly 32 which is shown more fully in FIGS. 3 and 4.

From the foregoing description, it is seen that the horizontal and vertical pins allow relative lateral pivoting and/or rotation of the tractor and scraper portions. It is also seen that considerable structures (not shown) in the form of a multitude of hydraulic and/or electrical lines are present in the area of the hitch pin assembly 32. Accordingly, the hitch pin assembly has been formed to provide an improved structure that may be serviced from either side as will become more apparent hereinafter.

Figure 3:
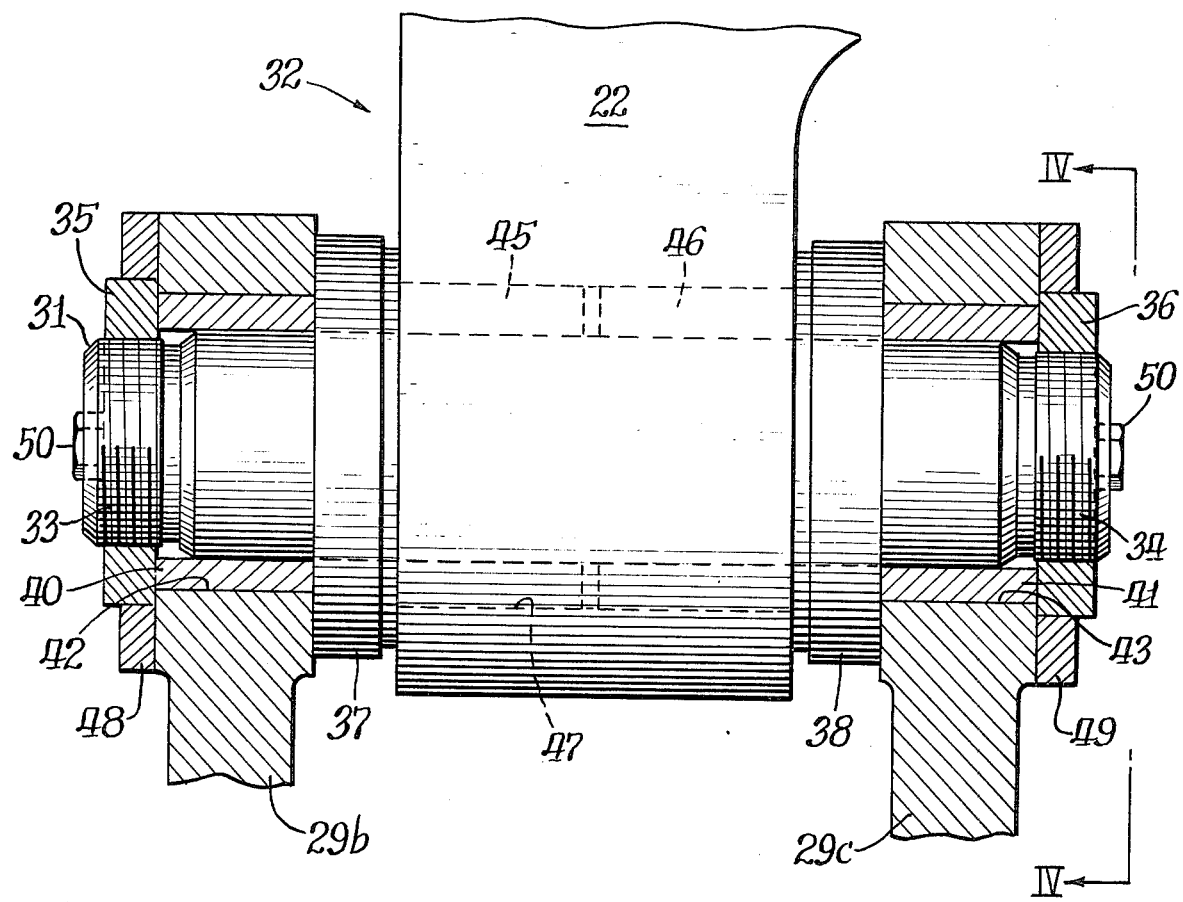
FIG. 3 is an enlarged sectional view of the pin joint incorporated in the hitch pin assembly shown in FIG. 2 taken from the circled area III indicated thereon.
Figure 4:
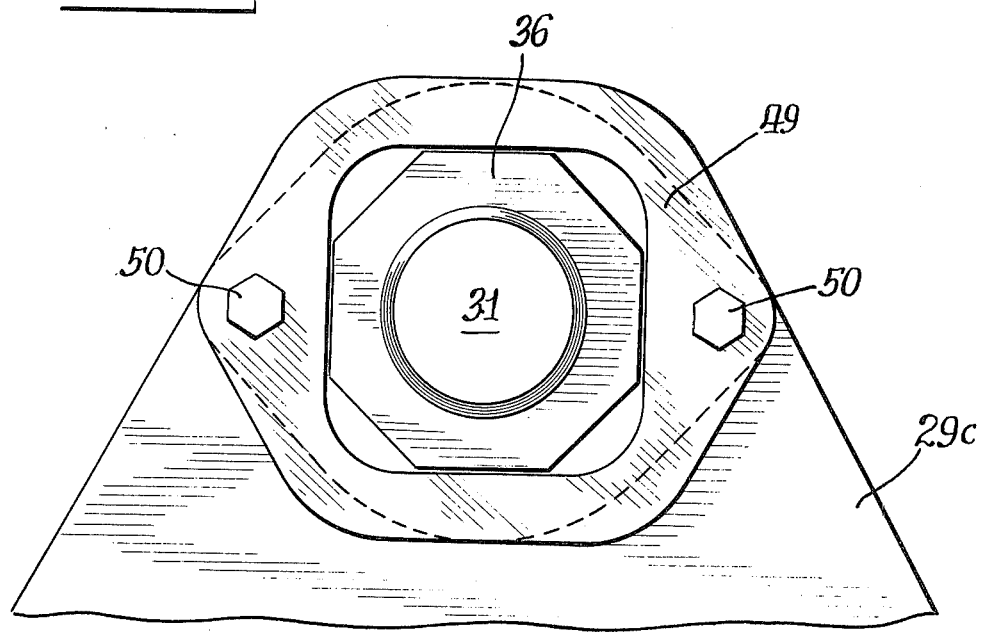
FIG. 4 is an end view of the hitch pin assembly taken along the lines IV—IV of FIG. 3.

Referring more particularly to FIGS. 3 and 4, hitch pin assembly 32 comprises the hitch pin 31, which is formed with threaded portions 33 and 34 on opposite ends, and octagonal nuts 35 and 36 formed to threadably engage the two threaded portions. Thrust packages 37 and 38, which include various types of thrust absorbing washers, are interposed between the bracket and the tractor frame 29, as shown. Bushings 40 and 41 are retained within bores 42 and 43, respectively, of the yoke 29a of the tractor frame member 29. In addition, a pair of bearings 45 and 46 (shown in dotted lines) are contained within a bore 47 of the bracket 22. The pin 31 is fit within the bushings 40 and 41, the thrust packages 37 and 38, and the bearings 45 and 46 as shown. With this construction, relative pivotal motion is provided for between bracket 22 and pin 31. The octagonal nuts 35 and 36 are secured to provide the desired fit against thrust packages 37 and 38, and held in proper location by a pair of locking elements in the form of retainer plate 48 and 49. These retainer plates are then secured to the tractor frame 29 by a plurality of cap screws 50 as best shown in FIG. 4.

In order to assemble hitch pin assembly 32, bushings 40 and 41 are first inserted to the bores 42 and 43 of the frame member 29. Bearings 45 and 46 are likewise positioned in bore 47 of bracket 22 and the bracket and frame members are brought into appropriate alignment such that the bracket fits between the legs 29b and 29c of yoke 29a. The thrust packages 37 and 38 are then positioned on each side of the bracket and the horizontal pin 31 is inserted through these members to make the pivot connection. Nut 35 and 36 are then threaded into each end of the pin until the desired mode or tightness is achieved. Retaining plates 48 and 49 are then placed over the octagonal nuts 35 and 36 and the cap screws 50 are tightened to hold the retaining position. Some slight alignment of the nut will usually be necessary in order to secure the retaining plate, since the flat side of the nut must coincide with the flat areas of the retaining plate. However, the maximum amount of adjustment would be somewhat less than 45° since each 45° angle of rotation of the nut causes another alignment position to come into registry with the retaining plate.

As mentioned above, congestion and closeness of quarters can make installation or removal, as well as adjustment of the pin 31, difficult. Therefore assembly may be achieved by placing one nut on to the pin before it is inserted through the bracket and frame members so as to require only adjustment and fastening of the other nut at the opposite end.

Adjustment, which is generally necessary during the operating life of the tractor scraper vehicle, is achieved by the following sequence. The cap screws 50 holding a retainer plate is removed, and the eight sided nut is then tightened or loosened as the case may be. Alignment of the nut with the retainer plate is achieved by rotation of the nut and the retaining plate is then placed back over the nut and the cap screw is refastened. Accordingly, it is seen that the use of the octagonal nut together with a retaining plate having a retaining socket provides for minimal alignment of the nut. It is also seen that the retaining plate positively locks the nut into position. Accordingly with the nuts locked securely into position at both ends of the pin 31, the pin 31 is positively held, and the adjustment against the thrust package is positively maintained.

It will also be appreciated that the adjustment can be accomplished from either end, since each end is similar in construction. In addition, since the components of the tractor scraper unit as described, including the nuts 35 and 36 are generally large in size, securing of these and any adjustment necessarily must be made with relatively large tools. It is therefore seen that the construction of this invention alleviates the problem of manipulating the large tools caused by the closeness of related components including a multitude of hydraulic or electrical lines.

What is claimed:

1. A hitch pin assembly for a tractor scraper vehicle and the like, comprising a pair of machine elements carried on said vehicle, a pivot pin threaded at both ends and fitted within a bore formed completely through said machine elements to pivotally connect said machine elements so that the pin may be inserted from one side of the elements and removed from the other side thereof, a pair of adjusting nuts threadably mounted on the respective threaded ends of the pivot pin, and a pair of locking elements each secured to one of said machine elements and removably engaging a respective one of the pair of adjusting nuts and restraining it against rotation with respect to said one of the machine elements and so that said pivot pin is positively held relative one of the machine elements while said other of said machine elements is rotatable relative said pivot pin.

2. A hitch pin assembly as defined in claim 1, in which each of the locking elements are in the form of a plate having a socket sized to fit over one of the said adjusting nuts.

3. A hitch pin assembly as defined in claim 2, in which the adjusting nuts are each octagonal, and the sockets of the plates are generally square.

4. A hitch pin assembly as defined in claim 3, which also comprises removable fastening means for securing the locking elements to the machine element.

5. A hitch pin assembly for an articulated tractor scraper vehicle and the like, comprising a pair of pivot pin receiving means one mounted on the tractor and one mounted on the towed scraper and each having a central bore extending entirely therethrough, one of said pivot pin receiving means being bifurcated with the other of said pivot pin receiving means disposed between its bifurcated portions, bearing means fitted within the central bore of said other of said pivot pin receiving means with the bearing means being formed with a central bore, a pivot pin threaded at both ends and removably fitted in the central bore of said bifurcated pivot pin receiving means and the central bore of said bearing means, said pivot pin axially removable from either end of said bores, a pair of adjusting nuts threadably mounted on the respective threaded ends of the pivot pin, and a pair of locking elements each secured to said bifurcated pivot pin receiving means and removably engaging a respective one of the pair of adjusting nuts and restraining its against rotation with respect to said bifurcated pivot pin receiving means and so that said pivot pin is positively held relative one of the machine elements, while said other of said machine elements is rotatable relative said pivot pin.

6. A hitch pin assembly as defined in claim 5, in which each of the locking elements are in the form of a plate having a socket sized to fit in restraining relation against one of said adjusting nuts.

7. A hitch pin assembly as defined in claim 6 in which the adjusting nuts are octagonal.

8. A hitch pin assembly as defined in claim 7, which also comprises removable fastening means for securing the locking elements to the bifurcated machine element.

* * * * *